Aug. 25, 1931.  A. J. FLEITER  1,820,132
WATCHCASE VULCANIZER
Filed April 29, 1927  2 Sheets-Sheet 1

INVENTOR
ANDREW J. FLEITER
BY Elyv Barrow
ATTORNEYS

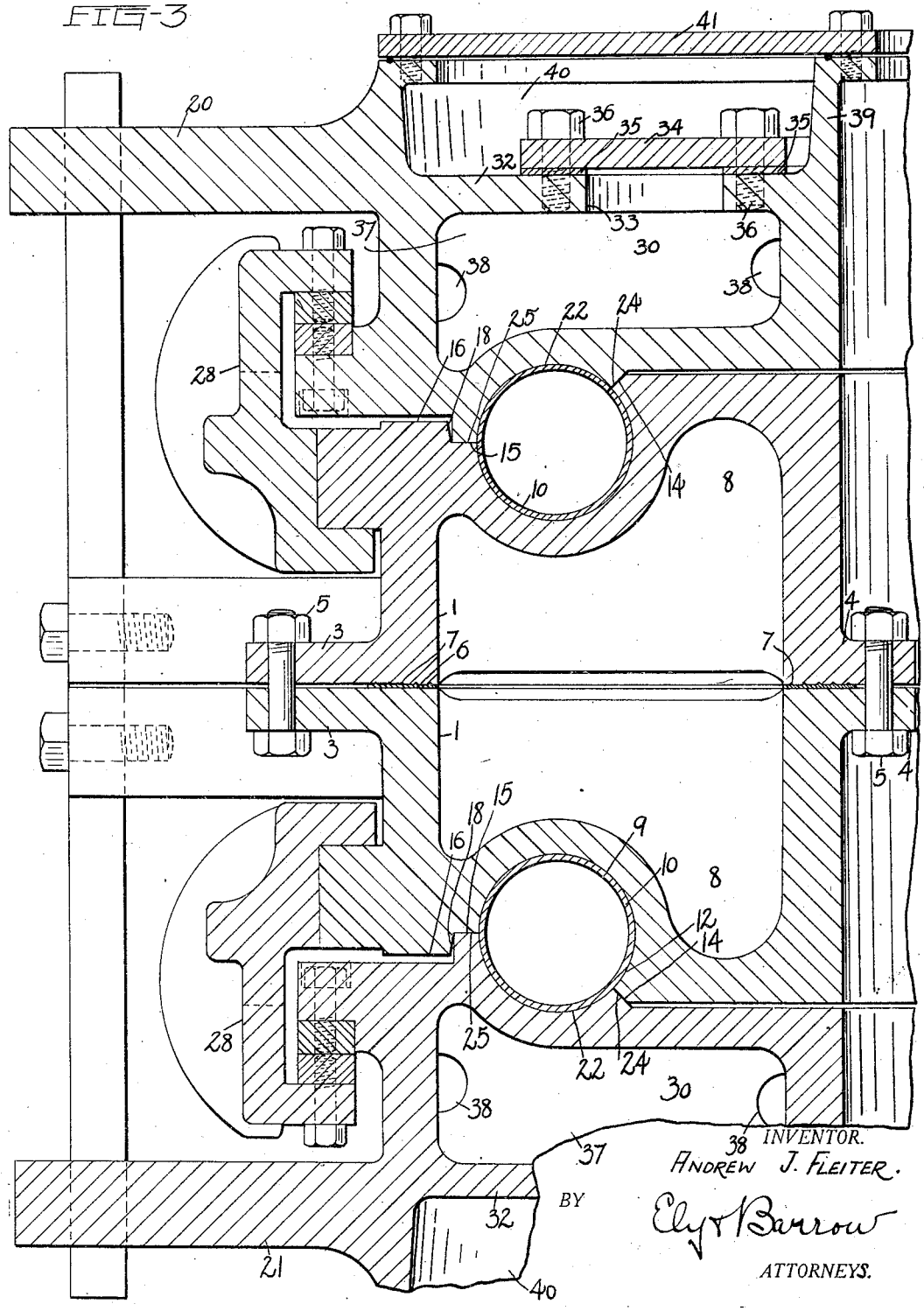

Patented Aug. 25, 1931

1,820,132

UNITED STATES PATENT OFFICE

ANDREW J. FLEITER, OF AKRON, OHIO, ASSIGNOR TO THE AKRON STANDARD MOLD COMPANY, OF AKRON, OHIO, A CORPORATION OF OHIO

WATCHCASE VULCANIZER

Application filed April 29, 1927. Serial No. 187,528.

This invention relates to that type of vulcanizer for use in curing pneumatic tires or inner tubes known as the "watchcase" vulcanizer, the object of the invention being to improve upon the construction of the stationary and movable sections of the vulcanizer, thereby reducing the difficulties of manufacture and improving upon the operation and efficiency of the mechanism. The apparatus is shown particularly for the vulcanization of inner tubes, although certain of its features are not necessarily limited to the manufacture of tubes.

In the drawings, in which the preferred construction is shown,

Figure 3 is an enlarged cross-section at the side of the vulcanizer.

Figure 1:
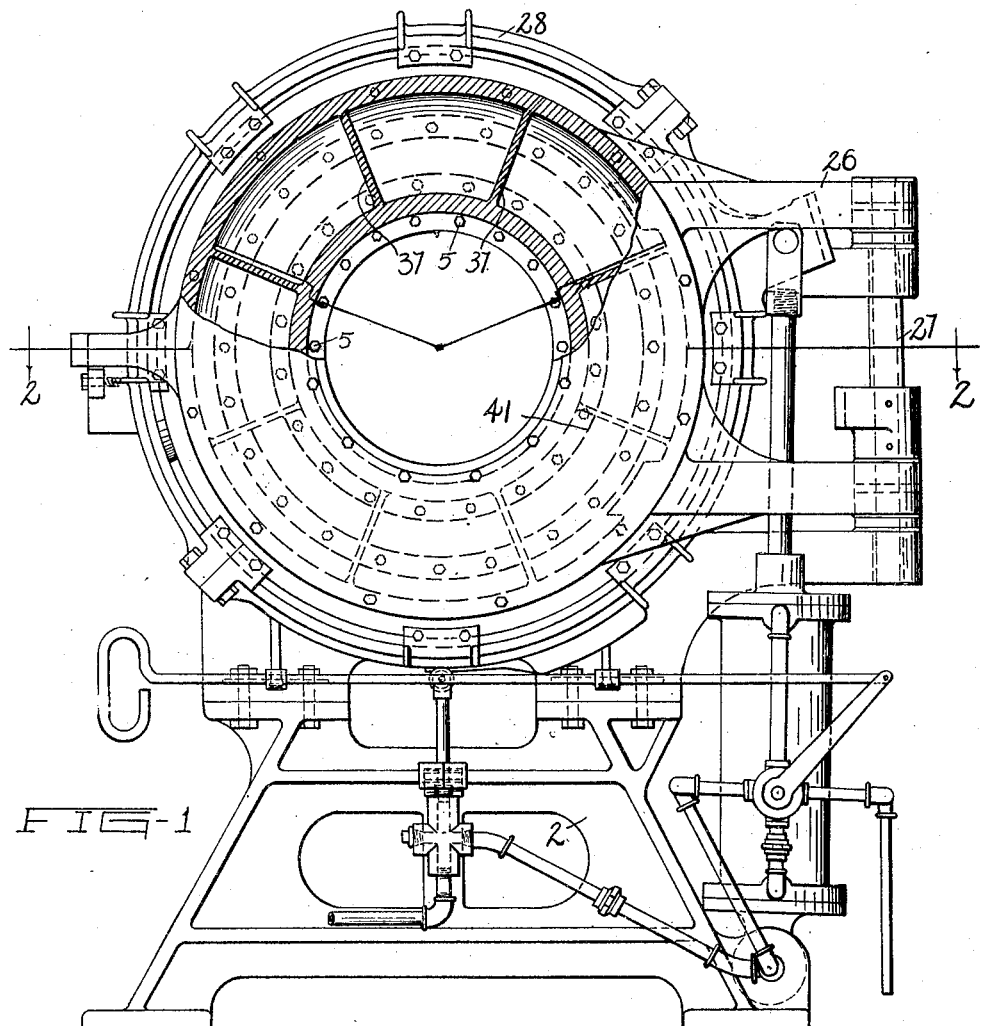
Figure 1 is a side elevation of a watchcase vulcanizer of the type referred to herein, a portion being broken away to show the interior construction.
Figure 2:
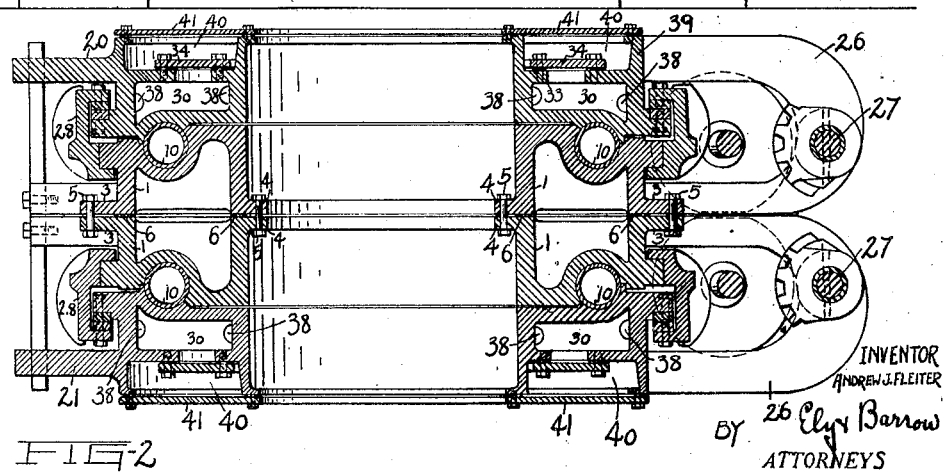
Figure 2 is a cross-section on the line 2—2 of Figure 1.

The watchcase vulcanizer herein shown comprises a central or stationary member which is made up of two similarly formed, but oppositely positioned castings 1 supported upon a standard 2. The parts 1 are provided with outer and inner flanges 3 and 4 through which securing bolts 5 are passed. Gaskets 6 are located between the castings to make a leak-proof joint, one or both of the surfaces being serrated or roughened, as shown at 7, to form a more perfect seal about the union between the castings.

Each part of the vulcanizer is provided with a hollow chamber 8 and on the outer surface with a peripheral cavity 9 adapted to seat one side of the article to be vulcanized. In the form of the invention shown herein, the members are designed for the curing of inner tubes, which are shown at 10.

The inner circumference of the tube cavity extends beyond the central plane of the tube so as to provide an outwardly extending ledge 12 in which the inner periphery of the tube will readily seat, the cavity 8 being extended around the lower side of the tube. By this construction, not only is the tube seated more easily within the cavity and with less liability for pinching, but the heat of the steam chamber on the interior of the mold is brought around the under side of the tube. At the edge of the stationary mold member, the surface is beveled or tapered, as indicated at 14, so as to insure a tight fit, reducing the amount of rind formed about the tube. The outer surface of the tube cavity is divided on a radial line 15 at the central plane of the tube, a flange 16 being formed outwardly of the division line so as to afford a more secure closing of the mold, the inner edge of the flange being tapered or beveled, as shown at 18.

The parts 1 and 2 each form portions of the tube molding cavity, the cavity being closed by means of swinging or movable mold members 20 and 21. In the inner face of each section 20 and 21 is formed a cavity or recess 22 which is complementary to the recess 9. Along the inner surface of the cavity 22 is formed a beveled surface 24 which fits against the beveled surface 14, and on the outside of the cavity is formed the plane surface 25 which fits against the surface 15. Except along the meeting surfaces 14 and 24 and 15 and 25, the outer or swinging section is spaced slightly from the stationary section so as to insure a tight fit around the vulcanizing cavity. The swinging sections are carried upon arms 26 which are pivoted upon vertical pins 27 at the rear of the apparatus. The swinging sections are held in close fitting relationship to the stationary section by means of rotary cam locking rings 28, as is well known in this art.

Each swinging section is provided with an inner chamber or steam cavity 30 defined by an intermediate wall 32. The wall 32 is provided with an annular opening 33 about the entire periphery of the section for the purpose of facilitating the casting operations, the opening being closed by a plate 34, the edges of which are sealed by gaskets 35 and held in place by bolts 36. The wall 32 is supported by a plurality of webs 37 having transverse openings 38 at the ends to facilitate drainage of the chamber.

Exteriorly of the sections, the walls are extended to form flanges 39 which define chamber 40 closed in by cover plates 41. These chambers containing air, afford a very effective insulation for the steam chambers 30 and prevent loss of heat in the vulcanizer.

The details of the means for operating the vulcanizer need not be described as they form no part of the present invention, which is directed particularly to the construction of the members constituting the vulcanizer sections, as set forth in the attached claims, in which the invention is defined. The improvements which are noted are especially valuable in facilitating the casting and forming operations and in effecting a more satisfactory and easily operated watchcase vulcanizer.

What is claimed is:

1. A vulcanizer section comprising a side having a vulcanizing cavity therein, inner and outer peripheral walls about the section, a transverse wall midway of the section, an outer cover plate completely bridging the walls so that the section is divided into inner and outer chambers, the outer chamber extending to either side of the inner, the transverse wall being provided with openings, a removable plate over the openings, and webs connecting the transverse wall with the body of the section.

2. A vulcanizer section comprising a side having a vulcanizing cavity therein, inner and outer peripheral walls about the section, a transverse wall midway of the section, an outer cover plate completely bridging the walls so that the section is divided into inner and outer chambers, the outer chamber extending past the sides of the inner, the transverse wall being provided with openings, a removable plate over the openings, and webs connecting the transverse wall with the body of the section, the webs being provided with transverse passageways.

ANDREW J. FLEITER.